United States Patent
Sasaki

(10) Patent No.: US 12,041,626 B2
(45) Date of Patent: Jul. 16, 2024

(54) RADIO TERMINAL, BASE STATION, AND METHOD THEREFOR

(71) Applicant: NEC Corporation, Tokyo (JP)

(72) Inventor: Takahiro Sasaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 352 days.

(21) Appl. No.: 17/429,818

(22) PCT Filed: Dec. 20, 2019

(86) PCT No.: PCT/JP2019/050105
§ 371 (c)(1),
(2) Date: Aug. 10, 2021

(87) PCT Pub. No.: WO2020/166207
PCT Pub. Date: Aug. 20, 2020

(65) Prior Publication Data
US 2022/0132474 A1    Apr. 28, 2022

(30) Foreign Application Priority Data

Feb. 12, 2019    (JP) .................................. 2019-022949

(51) Int. Cl.
*H04W 72/23* (2023.01)
*H04W 72/044* (2023.01)

(52) U.S. Cl.
CPC ......... *H04W 72/23* (2023.01); *H04W 72/044* (2013.01)

(58) Field of Classification Search
CPC ............................. H04W 72/23; H04W 72/044
See application file for complete search history.

(56) References Cited

U.S. PATENT DOCUMENTS

| | | | | |
|---|---|---|---|---|
| 2014/0192775 | A1* | 7/2014 | Li | H04W 74/006 370/331 |
| 2019/0305867 | A1* | 10/2019 | Tseng | H04L 5/0094 |
| 2019/0349964 | A1* | 11/2019 | Liou | H04W 76/27 |
| 2020/0008216 | A1 | 1/2020 | Iyer et al. | |

FOREIGN PATENT DOCUMENTS

WO    2018175420 A1    9/2018

OTHER PUBLICATIONS

International Search Report for PCT Application No. PCT/JP2019/050105, mailed on Mar. 17, 2020.

(Continued)

*Primary Examiner* — Duc C Ho
(74) *Attorney, Agent, or Firm* — Sughrue Mion, PLLC

(57) ABSTRACT

A radio terminal receives a first information element indicating a list of search spaces configured by a base station for the radio terminal via a dedicated signaling message destined for the radio terminal. The first information element contains a second information element indicating a configuration of each search space required by the radio terminal to monitor downlink control information in each search space included in the list. The first information element further contains a third information element indicating, on a per-search space basis, whether each search space is initially deactivated. This contributes to, for example, promptly deactivating a radio resource range used for transmission of downlink control information or promptly deactivating a reception operation of a radio terminal therein.

20 Claims, 10 Drawing Sheets

---

401: RECEIVE LIST OF SEARCH SPACES TO BE CONFIGURED IN UE FROM GNB VIA RRC MESSAGE; THIS LIST INDICATING, ON A PER-SEARCH SPACE BASIS, WHETHER EACH SEARCH SPACE IS INITIALLY DEACTIVATED

402: DETERMINE, ON A PER-SEARCH SPACE BASIS, WHETHER EACH CONFIGURED SEARCH SPACE NEEDS TO BE MONITORED TO RECEIVE DCI

(56) References Cited

OTHER PUBLICATIONS

Media Tek Inc., "Adaptation Designs for NR UE Power Saving", R1-1900192, 3GPP TSG RAN WG1 Ad-Hoc Meeting 1901, Taipei, Taiwan, Jan. 21, 2019, pp. 1-12.
Oppo, "UE Adaptation to the Traffic and UE Power Consumption", R1-1900305, 3GPP TSG RAN WG1 Ad-Hoc Meeting 1901, Taipei, Taiwan, Jan. 21, 2019, pp. 1-10.
CMCC, "Discussion on UE power saving schemes with adaption to UE traffic", 3GPP TSG RAN WG1 Ad-Hoc Meeting 1901, R1-1900421, Taipei, Taiwan, Jan. 21, 2019, pp. 1-8.
InterDigital Inc., "On Power Saving Techniques", R1-1900813, 3GPP TSG RAN WG1 Ad-Hoc Meeting 1901, Taipei, Taiwan, Jan. 21, 2019, pp. 1-6.
Qualcomm Incorporated, "UE Adaptation to the Traffic and UE Power Consumption Characteristics". R1-1900911, 3GPP TSG RAN WG1 Ad-Hoc Meeting 1901, Taipei, Taiwan, Jan. 21, 2019, pp. 1-24.
Samsung, "On UE adaptation Schemes", R1-1901087, 3GPP TSG RAN WG1 Ad-Hoc Meeting 1901, Taipei, Taiwan, Jan. 21, 2019, pp. 1-13.
3rd Generation Partnership Project, "Technical Specification Group Radio Access Network; NR: Study on UE Power Saving (Release 16)", 3GPP TR 38.840 V0.1.0 (Nov. 2018), pp. 1-24.
Ericsson, "Maintenance issues of physical downlink control channel", Tdoc R1-1811488, 3GPP TSG-RAN WG1 Meeting #94bis, Chengdu, China, Oct. 8, 2018, pp. 1-13.

\* cited by examiner

620

| R | Serving Cell ID | | | | | BWP ID | | Oct 1 |
|---|---|---|---|---|---|---|---|---|
| SS7 | SS6 | SS5 | SS4 | SS3 | SS2 | SS1 | R | Oct 2 |
| SS15 | SS14 | SS13 | SS12 | SS11 | SS10 | SS9 | SS8 | Oct 3 |

| R | Serving Cell ID | | | | | BWP ID | | Oct 1 |
|---|---|---|---|---|---|---|---|---|
| SS8 | SS7 | SS6 | SS5 | SS4 | SS3 | SS2 | SS1 | Oct 2 |
| R | SS15 | SS14 | SS13 | SS12 | SS11 | SS10 | SS9 | Oct 3 |

Fig. 6C

RADIO TERMINAL, BASE STATION, AND METHOD THEREFOR

This application is a National Stage Entry of PCT/JP2019/050105 filed on Dec. 20, 2019, which claims priority from Japanese Patent Application 2019-022949 filed on Feb. 12, 2019, the contents of all of which are incorporated herein by reference, in their entirety.

TECHNICAL FIELD

The present disclosure relates to a radio communication system and, in particular, to transmission of downlink control information from a base station to a radio terminal.

BACKGROUND ART

A base station (e.g., Long Term Evolution (LTE) eNB or NR gNB) transmits downlink control information (DCI) to a radio terminal (e.g., User Equipment (UE) or NR UE) via a physical layer downlink control channel (e.g., Physical Downlink Control Channel (PDCCH). The DCI is used in a variety of purposes and accordingly various DCI formats are defined. One of the main objectives of the DCI is notifying a radio terminal of scheduling of a Physical Uplink Shared Channel (PUSCH) and scheduling of a Physical Downlink Shared Channel (PDSCH) (i.e., resource allocation). In addition, the DCI is used, for example, to send transmission power control.

A radio terminal is required to attempt to decode each PDCCH candidate within a resource range that is pre-defined (or configured by a base station), in order to detect a PDCCH containing DCI (hereinafter referred to as PDCCH/DCI) destined for itself. Specifically, the UE needs to check all possible PDCCH locations, PDCCH formats, and DCI formats. This operation is called blind decoding.

The locations where PDCCH/DCI is possible to be transmitted depend on the PDCCH format (e.g., the number of CCEs aggregated for PDCCH transmission (i.e., aggregation level)). Each location where PDCCH/DCI is possible to be transmitted is referred to as a PDCCH candidate. A set of PDCCH candidates that the UE should monitor is referred to PDCCH search spaces, or simply search spaces. One search space is a set of PDCCH candidates for a certain PDCCH format. There are two types of search spaces, i.e., a UE-specific search space (USS) and a Common Search Space (CSS). The UE-specific search space is individually configured for the UE via a dedicated signaling message (e.g., Radio Resource Control (RRC) message). Thus, the UE needs to complete RRC connection establishment to obtain information about the UE-specific search space. On the other hand, all UEs know the extent or range of the Common Search Space. Every UE knows the Common Search Space where it needs to attempt blind decoding, via a pre-defined rule, via information that every UE can receive (i.e., Master Information Block (MIB)), or via a UE dedicated signaling message. The Common Search Space is used, for example, to broadcast system information, paging, and random-access channel (RACH) responses.

It is known that the UE needs to continuously perform many blind decoding attempts in a communication state, and this consumes a lot of power. Most of this power consumption is usually spent on decoding PDCCH that is not addressed to itself. To deal with this problem, a proposal has been made on a power saving scheme by reducing PDCCH monitoring and blind decoding (see Non-Patent Documents 1 to 7). Proposed schemes include, for example, but are not limited to, Triggering of PDCCH monitoring, PDCCH skipping, Multiple CORESET/search space configurations, and UE assistance information/feedback for the power saving schemes.

CITATION LIST

Non-Patent Literature

[Non-Patent Literature 1] MediaTek Inc., "Adaptation Designs for NR UE Power Saving", R1-1900192, 3GPP TSG RAN WG1 Ad-Hoc Meeting 1901, Taipei, Taiwan, 21-25 Jan. 2019

[Non-Patent Literature 2] OPPO, "UE Adaptation to the Traffic and UE Power Consumption", R1-1900305, 3GPP TSG RAN WG1 Ad-Hoc Meeting 1901, Taipei, Taiwan, 21-25 Jan. 2019

[Non-Patent Literature 3] CMCC, "Discussion on UE power saving schemes with adaption to UE traffic", R1-1900421, 3GPP TSG RAN WG1 Ad-Hoc Meeting 1901, Taipei, Taiwan, 21-25 Jan. 2019

[Non-Patent Literature 4] InterDigital, Inc., "On Power Saving Techniques", R1-1900813, 3GPP TSG RAN WG1 Ad-Hoc Meeting 1901, Taipei, Taiwan, 21-25 Jan. 2019

[Non-Patent Literature 5] Qualcomm Incorporated, "UE Adaptation to the Traffic and UE Power Consumption Characteristics", R1-1900911, 3GPP TSG RAN WG1 Ad-Hoc Meeting 1901, Taipei, Taiwan, 21-25 Jan. 2019

[Non-Patent Literature 6] Samsung, "On UE adaptation Schemes", R1-1901087, 3GPP TSG RAN WG1 Ad-Hoc Meeting 1901, Taipei, Taiwan, 21-25 Jan. 2019

[Non-Patent Literature 7] 3GPP TR 38.840 V0.1.0 (2018-11) "3rd Generation Partnership Project; Technical Specification Group Radio Access Network; NR; Study on UE Power Saving (Release 16)", November 2018

SUMMARY OF INVENTION

Technical Problem

According to the current 3GPP specifications, when a radio terminal is (semi-statistically) configured with search spaces via an RRC signaling message, the UE needs to attempt PDCCH monitoring in each configured search space. In other words, each search space configured for the UE is initially activated to allow the UE to attempt PDCCH monitoring on it. Accordingly, for example, in the above-mentioned power saving proposals, until the UE receives signaling (e.g., power saving signal or go-to-sleep signaling) indicating skipping of PDCCH monitoring on a certain search space (or deactivation of a certain search space), the UE needs to perform PDCCH monitoring on this search space. However, to reduce the power consumption required for PDCCH monitoring, it is preferable that a search space where the radio terminal does not have to receive be promptly deactivated.

One of the objects to be attained by embodiments disclosed herein is to provide apparatuses, methods, and programs that contribute to promptly deactivating a radio resource range (e.g., search space, control resource set (CORSET), CCEs, or resource element groups (REGs)) used for transmission of downlink control information, or promptly deactivating a reception operation of a radio terminal therein. It should be noted that this object is merely one of the objects to be attained by the embodiments disclosed herein. Other objects or problems and novel features will be made apparent from the following description and the accompanying drawings.

Solution to Problem

In a first aspect, a radio terminal includes at least one memory and at least one processor coupled to the at least one memory. The at least one processor is configured to receive a first information element indicating a list of search spaces configured by a base station for the radio terminal via a dedicated signaling message destined for the radio terminal. The first information element contains a second information element indicating a configuration of each search space required by the radio terminal to monitor downlink control information in each search space included in the list. The first information element further contains a third information element indicating, on a per-search space basis, whether each search space is initially deactivated.

In a second aspect, a base station includes at least one memory and at least one processor coupled to the at least one memory. The at least one processor is configured to transmit to a radio terminal a first information element indicating a list of search spaces configured by the base station for the radio terminal via a dedicated signaling message destined for the radio terminal. The first information element contains a second information element indicating a configuration of each search space required by the radio terminal to monitor downlink control information in each search space included in the list. The first information element further contains a third information element indicating, on a per-search space basis, whether each search space is initially deactivated.

In a third aspect, a method for a radio terminal includes receiving a first information element indicating a list of search spaces configured by a base station for the radio terminal via a dedicated signaling message destined for the radio terminal. The first information element contains a second information element indicating a configuration of each search space required by the radio terminal to monitor downlink control information in each search space included in the list. The first information element further contains a third information element indicating, on a per-search space basis, whether each search space is initially deactivated.

In a fourth aspect a method for a base station includes transmitting to a radio terminal a first information element indicating a list of search spaces configured by the base station for the radio terminal via a dedicated signaling message destined for the radio terminal. The first information element contains a second information element indicating a configuration of each search space required by the radio terminal to monitor downlink control information in each search space included in the list. The first information element further contains a third information element indicating, on a per-search space basis, whether each search space is initially deactivated.

In a fifth aspect, a program includes instructions (software codes) that, when loaded into a computer, cause the computer to perform the method according to the above-described third or fourth aspect.

Advantageous Effects of Invention

According to the above-described aspects, it is possible to provide apparatuses, methods, and programs that contribute to promptly deactivating a radio resource range (e.g., search space, control resource set (CORSET), CCEs, or resource element groups (REGs)) used for transmission of downlink control information, or promptly deactivating a reception operation of a radio terminal therein.

BRIEF DESCRIPTION OF DRAWINGS

FIG. 6B is a diagram showing an example of a format of a MAC CE for activating/deactivating a search space;

FIG. 6C is a diagram showing an example of a format of a MAC CE for activating/deactivating a search space;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3GPP fifth generation mobile communication system (5G system). However, these embodiments may be applied to other radio communication systems, such as the LTE system and the LTE-Advanced system.

First Embodiment

Figure 1:
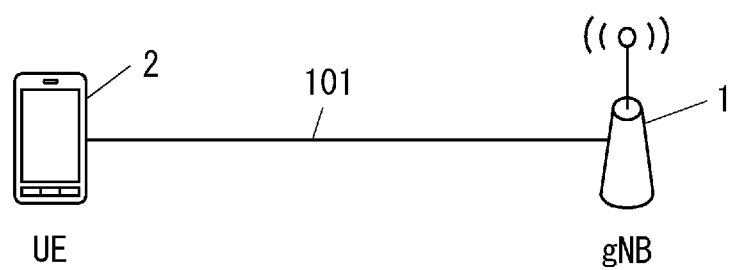
FIG. 1 is a diagram showing a configuration example of a radio communication network according to embodiments.

FIG. 1 shows a configuration example of a radio communication network according to embodiments including the present embodiment. In the example of FIG. 1. the radio communication network includes a base station (i.e., gNB) 1 and a radio terminal (i.e., UE) 2. The gNB 1 is arranged in a radio access network (RAN) (i.e., NG-RAN). The gNB 1 may include a gNB Central Unit (gNB-CU) and one or a plurality of gNB Distributed Units (gNB-DU) in a cloud RAN (C-RAN) deployment.

The UE 2 is connected to the gNB 1 via an air interface 101. The UE 2 may perform carrier aggregation (CA). Specifically, the UE 2 may be connected to a plurality of serving cells provided by the gNB 1 at the same time. The plurality of serving cells includes a primary cell (PCell) and one or more secondary cells (SCells). The UE 2 communicates with the gNB 1 using CA between the PCell and one or more SCells. In this case, the gNB 1 may configure search spaces and perform activation/deactivation of these to allow the UE 2 to synchronize PDCCH monitoring between the cells. That is, by way of example, and not limitation, the UE 2 may perform PDCCH monitoring in a plurality of cells at the same time (period). In addition, the UE 2 may monitor PDCCHs for multiple cells in one cell, or may perform, for example, but not limited to, PDCCH monitoring for multiple cells in the same search space at the same time (period) (cross carrier scheduling).

Furthermore, the UE 2 may be simultaneously connected to a plurality of base stations (i.e., Master gNB (MgNB) and Secondary gNB (SgNB)) for dual connectivity (Dual Connectivity). In this case, the gNB 1 shown in FIG. 1 may be a MgNB or an SgNB. The gNB 1, which serves as an MgNB, provides the UE 2 with a Master Cell Group (MCG) including the PCell and one or more SCells. On the other hand, the gNB 1, which serves as an SgNB, provides the UE 2 with a Secondary Cell Group (SCG) including the Primary SCG Cell (PSCell) and one or more SCells. Each of the PCell of the MCG and the PSCell of the SCG is also referred to as a Special Cell (SpCell). For example, when the cell groups (e.g., MCG and SCG) have been synchronized, the MgNB and the SgNB may share the configurations and states (i.e., activated or deactivated) of the search spaces of the MCG and the SCG with each other. Then, the MgNB and the SgNB may perform configuration and activation/deactivation of the search spaces to allow the UE 2 to synchronize PDCCH monitoring between the cell groups. That is, by way of example, and not limitation, the UE 2 may perform PDCCH monitoring in a plurality of cells of a plurality of cell groups at the same time (period).

The DC may be Multi-Radio Dual Connectivity (MR-DC). The MR-DC includes Evolved Universal Mobile Telecommunications System (UMTS) Terrestrial Radio Access (E-UTRA)-NR Dual Connectivity (EN-DC), NR-E-UTRA DC (NE-DC), NG-RAN EN-DC (NGEN-DC), and NR-NR DC (NR DC). In these cases, the gNB 1 of FIG. 1 may be an LTE eNB or may be an LTE eNB (Next generation (ng)-eNB) connectable to a 5G core network (5GC).

Figure 2:
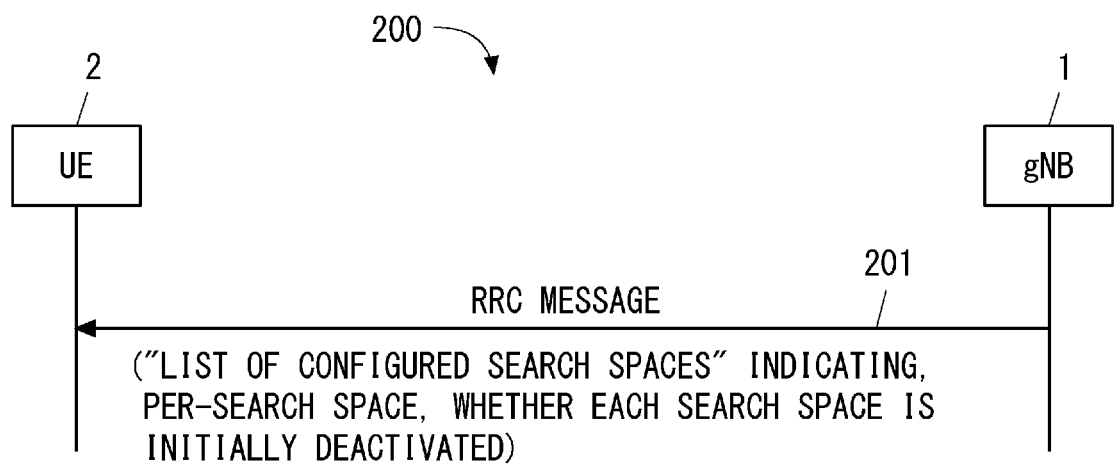
FIG. 2 is a sequence diagram showing an example of operations of a base station and a radio terminal according to a first embodiment.

FIG. 2 is a sequence diagram showing a process 200 that is an example of operations of the gNB 1 and the UE 2 according to this embodiment. In step 201, the gNB 1 transmits a dedicated signaling message to the UE 2. The dedicated signaling message is transmitted specifically (or dedicatedly) to the UE 2. In the case of the 5G system, the UE dedicated signaling message is, for example, an RRC message.

The RRC message of step 201 contains a first information element (IE) indicating a list of search spaces configured (i.e., added or modified) by the gNB 1 for the UE 2. The list may include one or more common search spaces, while it may include one or more UE-specific search spaces. The first information element contains a second information element indicating a configuration of each search space required by the UE 2 to monitor a PDCCH containing DCI (i.e., PDCCH/DCI) in each search space included in the list.

The second information element may indicate an identifier of each search space, for example. The second information element may further include at least one of: an information element indicating a resource location of each search space; an information element indicating a type of each search space; an information element indicating a type of downlink control information to be monitored in each search space; or an information element indicating periodicity of each search space.

Furthermore, the second information element contains a third information element that indicates, for each search space (on a per-search space basis), whether each search space is initially deactivated. Alternatively, the third information element may be contained in the first information element independently of the second information element.

In the case of the 5G system, the RRC message used for transmitting the first information element indicating the list of search spaces configured by gNB 1 is, for example, an RRC Setup message, an RRC Reconfiguration message, or an RRC Resume message. The RRC Setup message is transmitted to establish a signaling radio bearer (i.e., Signaling Radio Bearer 1 (SRB1)) when establishing an RRC connection. The RRC Reconfiguration message is transmitted to instruct the UE 2 to modify an already established RRC connection. The RRC Resume message is transmitted to resume a suspended RRC connection.

In the case of the 5G system, the above-described first information element (IE) indicating the list of search spaces may relate to multiple search spaces configured within a single downlink Bandwidth Part (BWP). Meanwhile, the second information element indicating the configuration of each search space and the third information element contained therein may relate to each search space configured within the downlink BWP.

More specifically, the RRC Setup message and RRC Resume message may include an MCG configuration (i.e., masterCellGroup IE). On the other hand, the RRC Reconfiguration message may include an MCG configuration (i.e., masterCellGroup IE), or an SCG configuration (i.e., masterCellGroup IE), or both. Each of the MCG configuration and the SCG configuration may include a configuration (i.e., ServingCellConfig IE) of each serving cell. The configuration of each serving cell may include a configuration (i.e., BWP-DownlinkDedicated IE) of dedicated (i.e., UE-specific) parameters regarding the downlink BWP. The dedicated configuration regarding the downlink BWP may include a PDCCH configuration (i.e., PDCCH-Config IE) containing the list of search spaces (i.e., searchSpacesToAddModList IE) to be configured (i.e., added or modified). The list of search spaces is a list of UE specifically configured search spaces and includes a configuration (i.e., Search Space IE) of each search space. In the current 3GPP specifications, the network can configure 10 search spaces (including UE-specific and Common Search Spaces) per BWP per cell.

Note that, a serving cell configuration of an SCell may include a configuration of common parameters for a downlink BWP (i.e., BWP-DownlinkCommon IE). The Common configuration regarding the downlink BWP may include a PDCCH common configuration (i.e., PDCCH-ConfigCommon IE) containing a list of common search spaces (i.e., commonSearchSpaceList IE). The list of common search spaces is a list of additional common search spaces and includes a configuration (i.e., Search Space IE) of each additional common search space.

The third information element contained in the RRC message of step 201 may prompt or cause the UE 2 to determine, on a per-search space basis, whether each search space needs to be monitored to receive PDCCH/DCI, based on the third information element. In other words, the UE 2 may determine, on a per-search space basis, whether each search space needs to be monitored to receive PDCCH/DCI, based on the third information element. The UE 2 does not have to perform blind decoding for PDCCH/DCI reception in a deactivated search space. On the other hand, the UE 2 needs to perform blind decoding for PDCCH/DCI reception in an activated search space.

Specifically, the third information element may cause the UE 2 to, if it indicates deactivation, determine that the search space associated with it does not need to be monitored to receive PDCCH/DCI. On the other hand, the third information element may cause the UE 2 to, if it does not indicate deactivation, determine that the associated search space needs to be monitored to receive PDCCH/DCI. Accordingly, if the third information element indicates deactivation, the UE 2 may determine that the search space associated with this information element does not need to be monitored to receive PDCCH/DCI. On the other hand, if the third information element does not indicate deactivation, the UE 2 may determine that the associated search space needs to be monitored to receive PDCCH/DCI.

More specifically, the third information element may cause the RRC layer of the UE 2 to, if it indicates deactivation, inform the physical layer of the UE 2 that the search space associated with it does not need to be monitored. Accordingly, if the third information element indicates deactivation, the RRC layer of the UE 2 may inform the physical layer of the UE 2 that the search space associated with this information element does not need to be monitored. In other words, if the third information element indicates deactivation, the RRC layer of the UE 2 may configure the physical layer of the UE 2 not to monitor the search space associated with this search space.

Figure 3:
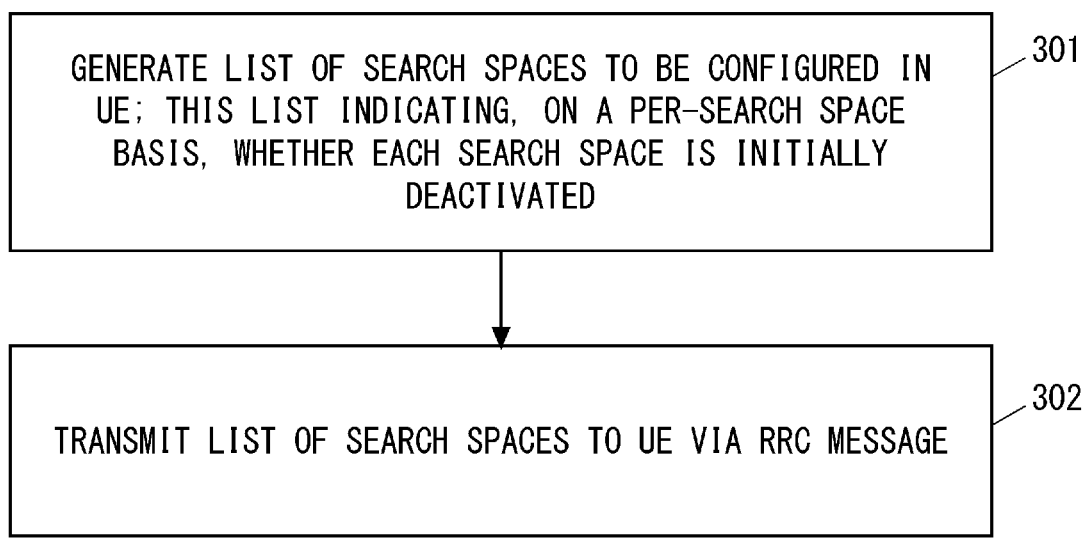
FIG. 3 is a flowchart showing an example of operation of a base station according to the first embodiment.

FIG. 3 is a flowchart showing an example of an operation of the gNB 1 according to this embodiment. In step 301, the gNB 1 generates a list of search spaces to be configured in the UE 2. The list indicates, on a per-search space basis, whether each search space is initially deactivated. In step 302, the gNB 1 transmits the list of search spaces to the UE 2 via an RRC message.

Figure 4:
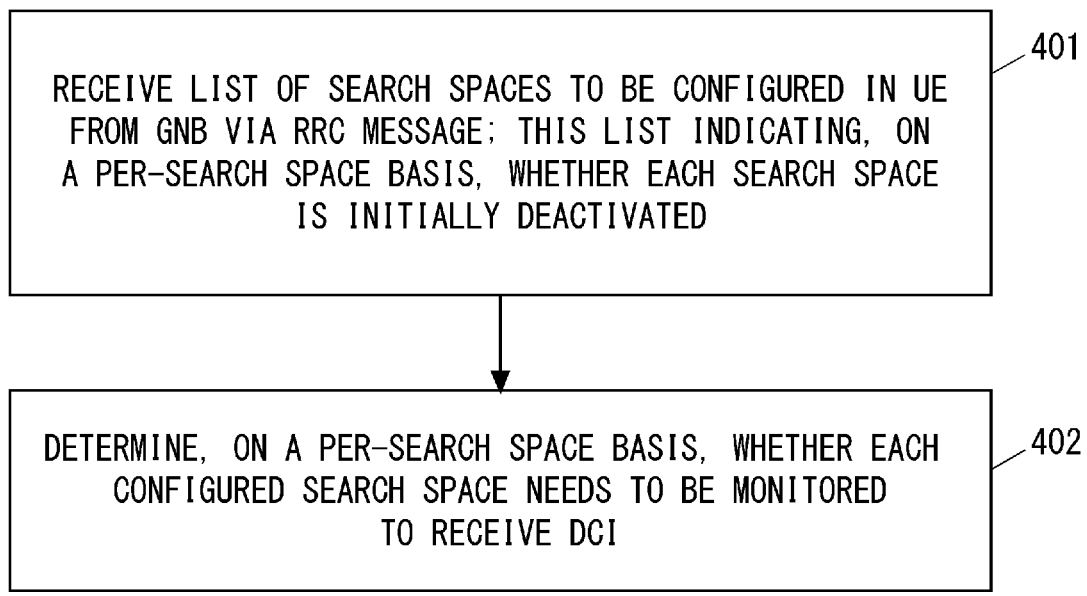
FIG. 4 is a flowchart showing an example of operation of a radio terminal according to the first embodiment.

FIG. 4 is a flowchart showing an example of an operation of the UE 2 according to this embodiment. In step 401, the UE 2 receives the list of search spaces to be configured in the UE 2 from the gNB 1 via the RRC message. In step 402, the UE 2 determines, on a per-search space basis, whether each configured search space needs to be monitored to receive PDCCH/DCI.

Figure 5:
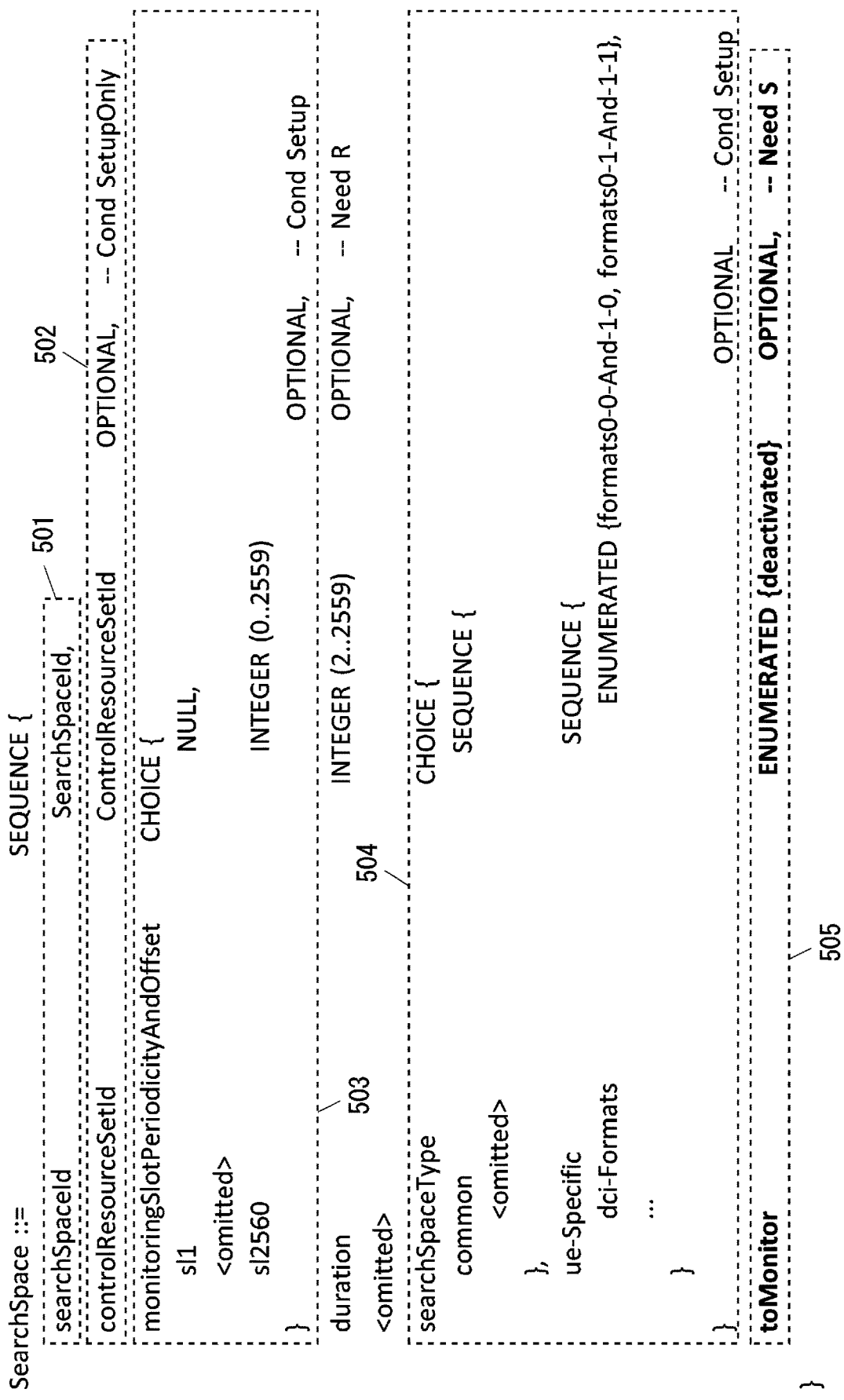
FIG. 5 is a diagram showing an example of a format of a Search Space information element transmitted by an RRC signaling message.

FIG. 5 shows an example of the format of the Search Space IE transmitted by an RRC signaling message. In the example of FIG. 5, the Search Space IE includes a "toMonitor" IE (505). The toMonitor IE (505) indicates that the search space associated with (or configured by) this search space IE is initially in the deactivated state. If the gNB 1 initially deactivates this search space, then the gNB 1 includes the toMonitor IE (505) in the Search Space IE. If the Search Space IE includes the toMonitor IE (505), the UE 2 may determine that the search space associated with this Search Space IE is initially in the deactivated state. On the other hand, if the Search Space IE does not include the toMonitor IE (505), the UE 2 may determine that the search space associated with this Search Space IE is initially activated.

On the contrary, if the gNB 1 initially activate this search space, then the gNB 1 may include the toMonitor IE (505) in the Search Space IE. In this case, if the Search Space IE does not include the toMonitor IE (505), the UE 2 may determine that the search space associated with this Search Space IE is initially in the deactivated state.

Alternatively, the Search Space IE may clearly indicate whether the initial state of the search space is activated or deactivated.

As shown in FIG. 5, the Search Space IE may contain other information elements, such as a searchSpaceId IE (501), a controlResourceSetId IE (502), a monitoringSlot-PeriodicityAndOffset IE (503), and a searchSpaceType IE (504). The searchSpaceId IE (501) indicates an identifier of the search space configured by this SearchSpace IE. The controlResourceSetId IE (502) indicates an identifier of a Control Resource Set (CORESET) to be applied for the search space configured by this Search Space IE. The CORESET is a set of physical resources and a set of parameters used to carry PDCCH/DCI. The monitoringSlot-PeriodicityAndOffset IE (503) indicates the periodicity and the offset to indicate slots in which PDCCH Monitoring needs to be performed. The searchSpaceType IE (504) indicates whether the search space configured by this Search Space IE is a common search space or a UE specific search space, it and indicates DCI formats that need to be monitored in this search space.

In one example, the gNB 1 may deactivate all the one or more UE-specific search spaces configured for the UE 2. In this case, the UE 2 may perform PDCCH/DCI reception in a common search space.

According to this embodiment, the gNB 1 transmits to the UE 2 a search space configuration for adding or modifying a plurality of search spaces, as well as an information element (i.e., the above-described third information element) indicating, on a per-search space basis, whether each search space is initially deactivated. Accordingly, the UE 2 can consider that a search space to be configured (i.e., added or modified) is deactivated from the beginning, based on this information element. In other words, based on this information element, the UE 2 can quickly deactivate a search space without activating the search space and can deactivate a receiving operation (e.g., blind decoding for PDCCH/DCI reception) in the search space. The UE 2 thus can operate not to perform blind decoding for PDCCH/DCI reception from the beginning in the newly configured (i.e., added or corrected) search space.

Second Embodiment

In this embodiment, a modification of the first embodiment will be described. The configuration example of a radio communication network according to the present embodiment may be similar to that illustrated in FIG. 1.

The gNB 1 may activate a search space that has been initially deactivated, at any time (at a given time), if necessary.

Furthermore, the gNB 1 may dynamically change the activation and deactivation of one or more search spaces in order to adjust the frequency (or cycle) at which the UE 2 monitors PDCCH/DCI.

For example, if the gNB 1 detects an increase in the scheduling frequency (or cycle) to the UE 2 (in other words, if it detects that the scheduling queue is short, or if it detects that the scheduling queue becomes shorter), then the gNB 1 may activate a search space that has been configured for the UE 2 but is in the inactive state. Specifically, the gNB 1 may transmit an indication (e.g., Layer-1 signaling or Layer-2 signaling) indicating activation of the search space to the UE 2.

Additionally or alternatively, if the gNB 1 receives an explicit or implicit request indicating an increase in the frequency (or period) of monitoring PDCCH/DCI is received from the UE 2, the gNB 1 may activate one or more search spaces that have been configured for the UE 2 but are in the inactive state. The request from the UE 2 to the gNB 1 may be RRC layer signaling, MAC layer (Layer-2) signaling, or physical layer (Layer-1) signaling.

In one example, the request may be physical layer signaling, such as a scheduling request or similar Uplink Control Information (UCI). In another example, the request may be included in an information element (e.g., UEAssistanceInformation IE) contained in a UE assistance information message of the RRC layer. More specifically, the request may be a delayBudgetReport IE included in the UEAssistanceInformation IE. The delayBudgetReport IE is used by the UE to inform the gNB of UE preference regarding a connected mode discontinuous reception (DRX). Alternatively, the request may be a newly defined information element for indicating the frequency (or cycle) of monitoring PDCCH/DCI. The new information element may be called, for example, a PrefPdcchPeriodReport IE, and may be an ENUMERATED-type value indicating the monitoring cycle (e.g., 0 ms, 2 ms, 4 ms, 5 ms, 8 ms, 10 ms, 20 ms, or 40 ms) desired by the UE.

On the contrary, for example, if the gNB 1 detects that the scheduling frequency (or cycle) to the UE 2 has decreased (in other words, if it detects that the scheduling queue is long, or if it detects that the scheduling queue becomes longer), then the gNB 1 may deactivate one or more activated search spaces of the UE 2. Specifically, gNB 1 may transmit an indication (e.g., Layer-1 signaling or Layer-2 signaling) indicating deactivation of the search space(s) to the UE 2.

Additionally or alternatively, if the gNB 1 receives an explicit or implicit request indicating a decrease in the frequency (or period) of monitoring PDCCH/DCI is received from the UE 2, the gNB 1 may deactivate one or more activated search spaces of the UE 2. As described with respect to the increase in the frequency (or period) of monitoring PDCCH/DCI, the request from the UE 2 to the gNB 1 may be RRC layer signaling, MAC layer (Layer-2) signaling or physical layer (Layer-1) signaling.

The gNB 1 may change the activation/deactivation of a search space of the UE 2 based on a Radio Network Temporary Identifier (RNTI). Specifically, the gNB 1 may determine a service type of the UE 2 from the RNTI and change the activation/inactivation of the search space according to the service type.

In the case of CA, the gNB 1 may transmit signaling for activating (or deactivating) a search space to the UE 2, for example via MAC layer (Layer-2) signaling, in another service cell different from the serving cell in which the search space has been configured.

The gNB 1 may use signaling of a lower layer (e.g., Physical (PHY) layer or Medium Access Control (MAC) layer), instead of the RRC layer, to activate (or deactivate) a search space. More specifically, the activation (or deactivation) of a search space may be performed by signaling of the physical layer (Layer-1), for example, PDCCH/DCI transmitted in any search space (e.g., common search space #0). Alternatively, the activation (or deactivation) of a search space may be performed by MAC layer (Layer-2) signaling, for example, by a MAC Control Element (CE).

Figure 6A:
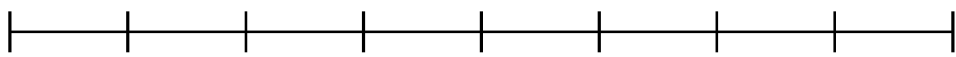
FIG. 6A is a diagram showing an example of a format of a Medium Access Control (MAC) Control Element (CE) for activating/deactivating a search space.

FIGS. 6A, 6B, and 6C show examples of a format of a MAC CE (e.g., Search Space Activation/Deactivation MAC CE) used for activating/deactivating a search space.

In the example of FIG. 6A, the first octet of a MAC CE 610 indicates a Serving Cell ID field and a BWP ID field. The Serving Cell ID field indicates an identifier of the serving cell to which the MAC CE is applied. The BWP ID field indicates an identifier of the downlink BWP to which the MAC CE is applied. The symbol "R" means a reserved bit. The SSi field (i.e., SS0 to SS15) in the second and third octets of the MACCE 610 indicates the activation status of the search space having Search Space ID #i. For example, the SSi field may be set to "0" to indicate that the search space having Search Space ID #i is deactivated. On the other hand, the SSi field may be set to "1" to indicate that the search space having the Search Space ID #i is activated.

Note that, the search space (search space #0) having Search Space ID #0 is associated with the common search space of the initial downlink BWP that is configured via the Master Information Block (MIB) transmitted in the Physical Broadcast Channel (PBCH). Since the search space #0 is always activated or is never configured in any SCell, the UE 2 may ignore the SS0 field of FIG. 6A. Alternatively, the Search Space Activation/Deactivation MAC CE does not have to include the SS0 field, like the MAC CE 620 and the MAC CE 630 shown in FIGS. 6B and 6C.

Third Embodiment

In the above embodiments, the gNB 1 may transmit an RRC message containing a list of search spaces to be configured in the UE 2, to the UE 2 via another base station (e.g., gNB or eNB). Specifically, when the UE 2 is handed over from another base station to the gNB 1, the gNB 1 may transmit the RRC message to the UE 2 via the other base station. Additionally or alternatively, when the gNB 1 serves as a secondary node (i.e., SgNB) of DC, the gNB 1 may transmit the RRC message to the UE 2 via another base station serving as the master node (e.g., MgNB or MeNB).

Fourth Embodiment

Figure 7:
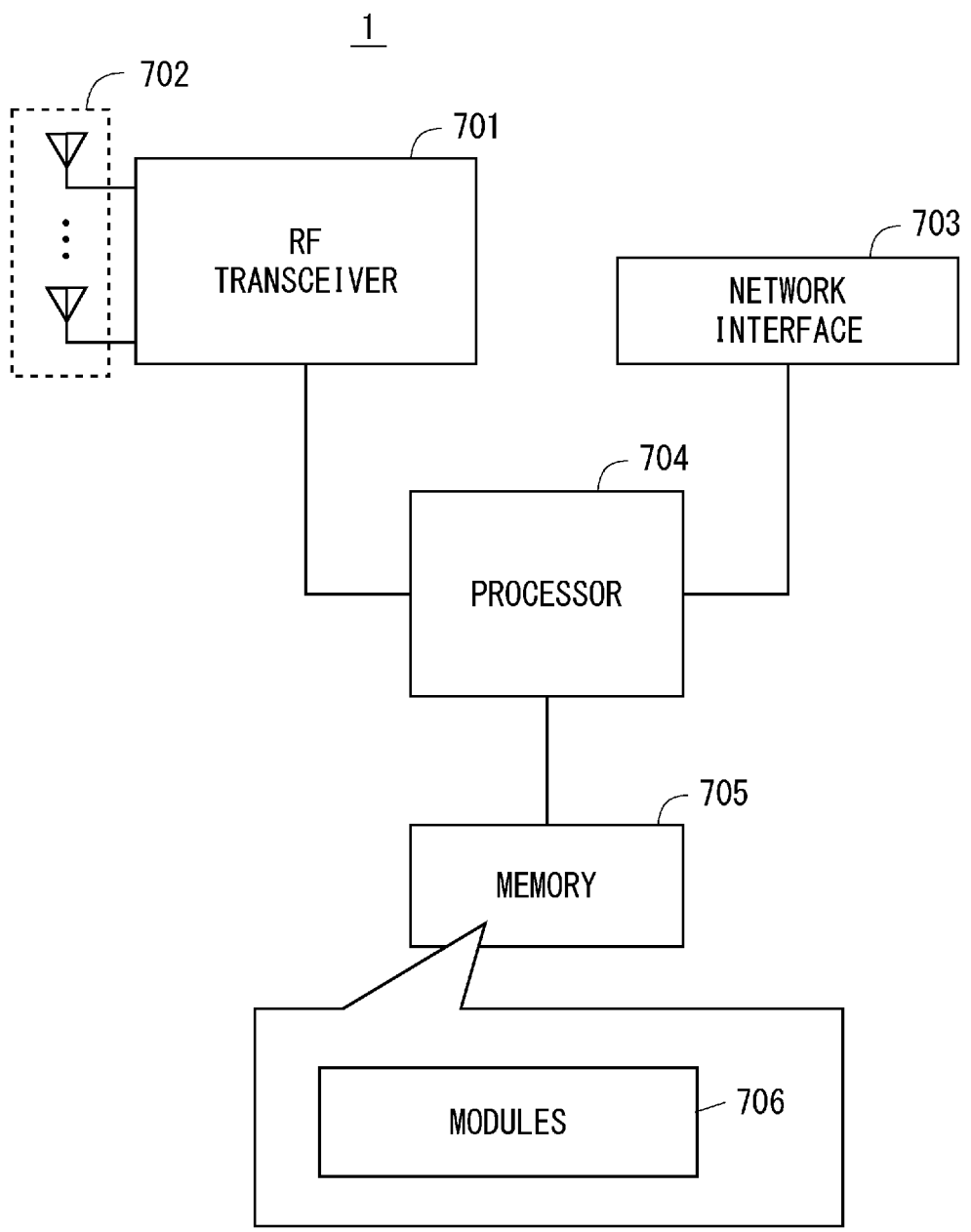
FIG. 7 is a block diagram showing a configuration example of a base station according to embodiments.

In the above-described embodiments, the gNB 1 and the UE 2 may be implemented as follows. FIG. 7 is a block diagram showing a configuration example of the gNB 1 according to the above-described embodiments. Referring to FIG. 7, the gNB 1 includes a Radio Frequency transceiver 701, a network interface 703, a processor 704, and a memory 705. The RF transceiver 701 performs analog RF signal processing to communicate with UEs including the UE 2. The RF transceiver 701 may include a plurality of transceivers. The RF transceiver 701 is coupled to an antenna array 702 and the processor 704. The RF transceiver 701 receives modulated symbol data from the processor 704, generates a transmission RF signal, and supplies the transmission RF signal to the antenna array 702. The RF transceiver 701 also generates a baseband received signal based on a received RF signal received by the antenna array 702 and supplies the baseband received signal to the processor 704. The RF transceiver 701 may include an analog beamformer circuit for beam forming. The analog beamformer circuit includes, for example, a plurality of phase shifters and a plurality of power amplifiers.

The network interface 703 is used to communicate with network nodes (e.g., control nodes and transfer nodes of a 5G Core). The network interface 703 may include, for example, a network interface card (NIC) conforming to the IEEE 702.3 series.

The processor 704 performs digital baseband signal processing (i.e., data-plane processing) and control-plane processing for radio communication. The processor 704 may include a plurality of processors. The processor 704 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing.

The digital baseband signal processing by the baseband processor 704 may include, for example, signal processing of a Service Data Adaptation Protocol (SDAP) layer, a Packet Data Convergence Protocol (PDCP) layer, a Radio Link Control (RLC) layer, a MAC layer, and a PHY layer. The control-plane processing performed by the baseband processor 704 may include processing of Non-Access Stratum (NAS) messages, RRC messages, MAC CEs, and DCIs.

The processor 704 may include a digital beamformer module for beam forming. The digital beamformer module may include a Multiple Input Multiple Output (MIMO) encoder and a pre-coder.

The memory 705 is composed of a combination of a volatile memory and a non-volatile memory. The volatile memory is, for example, a Static Random-Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 705 may include a storage located apart from the processor 704. In this case, the processor 704 may access the memory 705 via the network interface 703 or an I/O interface (not shown).

The memory 705 may store one or more software modules (computer programs) 706 including instructions and data to perform processing by the gNB 1 described in the above embodiments. In some implementations, the processor 704 may be configured to load the software modules 706 from the memory 705 and execute the loaded software modules, thereby performing processing of the gNB 1 described in the above embodiments.

When the gNB 1 is a gNB-CU, the gNB 1 does not need to include the RF transceiver 701 (and the antenna array 702).

Figure 8:
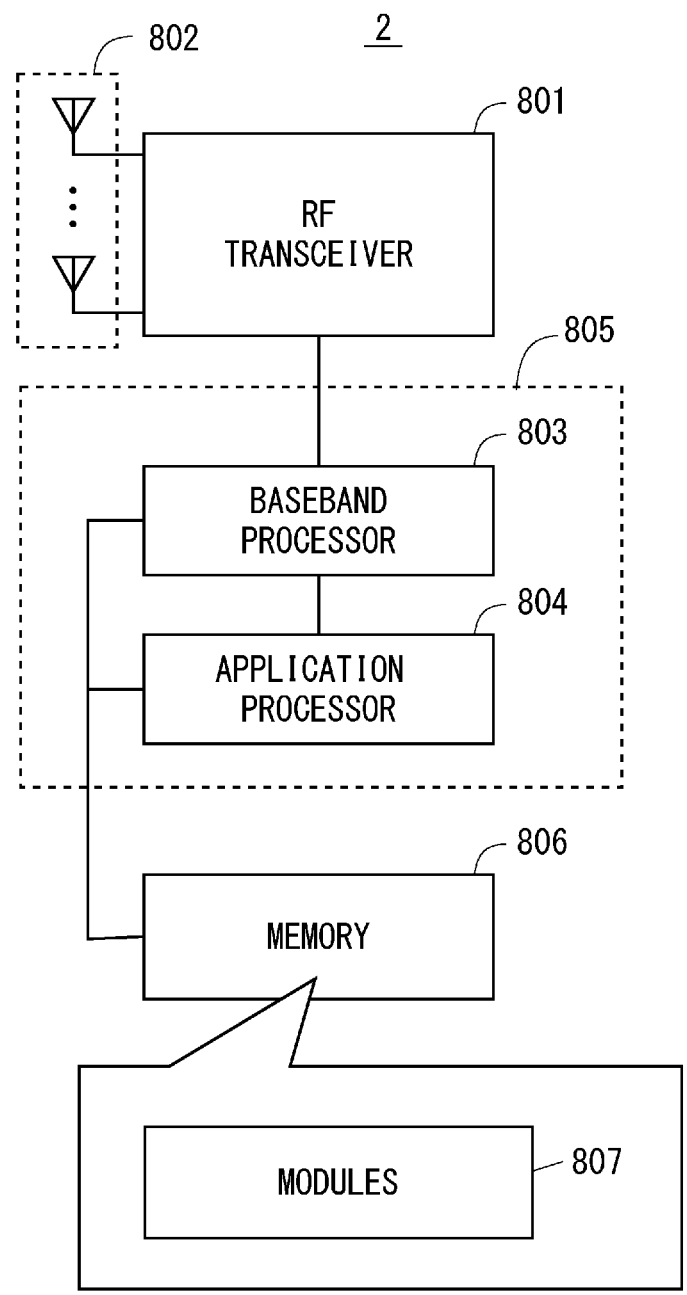
FIG. 8 is a block diagram showing a configuration example of a radio terminal according to embodiments.

FIG. 8 is a block diagram showing a configuration example of the UE 2. A Radio Frequency (RF) transceiver 801 performs analog RF signal processing to communicate with the gNB 1. The RF transceiver 801 may include a plurality of transceivers. The analog RF signal processing performed by the RF transceiver 801 includes frequency up-conversion, frequency down-conversion, and amplification. The RF transceiver 801 is coupled to an antenna array 802 and a baseband processor 803. The RF transceiver 801 receives modulated symbol data (or OFDM symbol data) from the baseband processor 803, generates a transmission RF signal, and supplies the transmission RF signal to the antenna array 802. The RF transceiver 801 also generates a baseband received signal based on a received RF signal received by the antenna array 802 and supplies the baseband received signal to the baseband processor 803. The RF transceiver 801 may include an analog beamformer circuit for beam forming. The analog beamformer circuit includes, for example, a plurality of phase shifters and a plurality of power amplifiers.

The baseband processor 803 performs digital baseband signal processing (i.e., data-plane processing) and control-plane processing for radio communication. The digital baseband signal processing includes, for example, (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 803 may include, for example, signal processing of a Service Data Adaptation Protocol (SDAP) layer, a Packet Data Convergence Protocol (PDCP) layer, a Radio Link Control (RLC) layer, a MAC layer, and a PHY layer. The control-plane processing performed by the baseband processor 803 may include processing of NAS messages, RRC messages, MAC CEs, and DCIs.

The baseband processor 803 may perform MIMO encoding and pre-coding for beam forming.

The baseband processor 803 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 804 described in the following.

The application processor 804 is also referred to as a CPU, an MPU, a microprocessor, or a processor core. The application processor 804 may include a plurality of processors (processor cores). The application processor 804 loads a system software program (Operating System (OS)) and various application programs (e.g., a call application, a WEB browser, a mailer, a camera operation application, and a music player application) from a memory 806 or from another memory (not shown) and executes these programs, thereby providing various functions of the UE 2.

In some implementations, as represented by a dashed line (805) in FIG. 8, the baseband processor 803 and the application processor 804 may be integrated on a single chip. In other words, the baseband processor 803 and the application processor 804 may be implemented in a single System on Chip (SoC) device 805. An SoC device may be referred to as a Large-Scale Integration (LSI) or a chipset.

The memory 806 is a volatile memory, a non-volatile memory, or a combination thereof. The memory 806 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 806 may include, for example, an external memory device that can be accessed from the baseband processor 803, the application processor 804, and the SoC 805. The memory 806 may include an internal memory device that is integrated in the baseband processor 803, the application processor 804, or the SoC 805. The memory 806 may also include a memory in a Universal Integrated Circuit Card (UICC).

The memory 806 may store one or more software modules (computer programs) 807 including instructions and data to perform the processing by the UE 2 described in the above embodiments. In some implementations, the baseband processor 803 or the application processor 804 may load these software modules 807 from the memory 806 and execute the loaded software modules, thereby performing the processing of the UE 2 described in the above embodiments with reference to the drawings.

The control-plane processing and operations performed by the UE 2 described in the above embodiments can be achieved by elements other than the RF transceiver 801 and the antenna array 802, i.e., achieved by the memory 806, which stores the software modules 807, and one or both of the baseband processor 803 and the application processor 804.

As described above with reference to FIGS. 7 and 8, each of the processors that the gNB 1 and the UE 2 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

Other Embodiments

Each of the above-described embodiments may be used individually or two or more embodiments may be appropriately combined with one another.

In the above embodiments, the serving cell configuration regarding the SCell may include information (e.g., flag) indicating a UE-specific search space that the UE 2 needs to always monitor. If a common search space is not configured in a downlink BWP of the SCell, the UE 2 can receive PDCCH/DCI by monitoring the UE-specific search space indicated by the flag. This type of UE-specific search space may be referred to as the default search space.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; power transmission equipment; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of trade and/or service industry equipment, a vending machine, an automatic service machine, an office machine or equipment, a consumer electronic and electronic appliance (for example a consumer electronic appliance such as: audio equipment; a speaker; a radio; video equipment; a television etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017 Jan. 13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

The above-described embodiments are merely examples of applications of the technical ideas obtained by the inventor. These technical ideas are not limited to the above-described embodiments and various modifications can be made thereto.

The whole or part of the embodiments disclosed above can be described as, but not limited to, the following supplementary notes.

(Supplementary Note 1)
A radio terminal comprising:
at least one memory; and
at least one processor coupled to the at least one memory and configured to receive a first information element indicating a list of search spaces configured by a base station for the radio terminal via a dedicated signaling message destined for the radio terminal, wherein
the first information element contains a second information element indicating a configuration of each search space required by the radio terminal to monitor downlink control information in each search space included in the list, and
the first information element further contains a third information element indicating, on a per-search space basis, whether each search space is initially deactivated.

(Supplementary Note 2)
The radio terminal according to Supplementary Note 1, wherein the at least one processor is configured to determine, on a per-search space basis, whether each search space needs to be monitored to receive downlink control information, based on the third information element.

(Supplementary Note 3)
The radio terminal according to Supplementary Note 1 or 2, wherein
the at least one processor is configured to, if the third information element indicates deactivation, determine that a search space associated with the third information element does not need to be monitored to receive downlink control information, and
the at least one processor is configured to, if the third information element does not indicate deactivation, determine that the search space associated with the third information element needs to be monitored to receive downlink control information.

(Supplementary Note 4)
The radio terminal according to any one of Supplementary Notes 1 to 3, wherein the at least one processor is configured to perform a Radio Resource Control (RRC) layer operation,
wherein the RRC layer operation includes, if the third information element indicates deactivation, informing a physical layer of the radio terminal that a search space associated with the third information element does not need to be monitored.

(Supplementary Note 5)
The radio terminal according to any one of Supplementary Notes 1 to 3, wherein the at least one processor is configured to perform a Radio Resource Control (RRC) layer operation,
wherein the RRC layer operation includes, if the third information element indicates deactivation, configuring a physical layer of the radio terminal not to monitor a search space associated with the third information element.

(Supplementary Note 6)
The radio terminal according to any one of Supplementary Notes 1 to 5, wherein the second information element includes an information element indicating an identifier of each search space.

(Supplementary Note 7)
The radio terminal according to any one of Supplementary Notes 1 to 6, wherein the second information element includes at least one of: an information element indicating a resource location of each search space; an information element indicating a type of each search space; an information element indicating a type of downlink control information to be monitored in each search space; or an information element indicating periodicity of each search space.

(Supplementary Note 8)
The radio terminal according to any one of Supplementary Notes 1 to 7, wherein
the first information element relates to a configuration of a single downlink Bandwidth Part (BWP), and
the second and third information elements relate to each search space configured within the downlink BWP.

(Supplementary Note 9)
The radio terminal according to any one of Supplementary Notes 1 to 8, wherein the dedicated signaling message is a Radio Resource Control (RRC) message.

(Supplementary Note 10)

The radio terminal according to Supplementary Note 9, wherein
  the first information element is a searchSpacesToAddModList information element,
  the second information element is a SearchSpace information element included in the searchSpacesToAddModList information element, and
  the third information element is contained in the SearchSpace information element.

(Supplementary Note 11)

The radio terminal according to any one of Supplementary Notes 1 to 10, wherein the at least one processor is configured to, when the radio terminal is handed over to the base station from another base station, receive the dedicated signaling message via the other base station.

(Supplementary Note 12)

A base station comprising:
  at least one memory; and
  at least one processor coupled to the at least one memory and configured to transmit to a radio terminal a first information element indicating a list of search spaces configured by the base station for the radio terminal via a dedicated signaling message destined for the radio terminal, wherein
  the first information element contains a second information element indicating a configuration of each search space required by the radio terminal to monitor downlink control information in each search space included in the list, and
  the first information element further contains a third information element indicating, on a per-search space basis, whether each search space is initially deactivated.

(Supplementary Note 13)

The base station according to Supplementary Note 12, wherein the third information element causes the radio terminal to determine, on a per-search space basis, whether each search space needs to be monitored to receive downlink control information.

(Supplementary Note 14)

The base station according to Supplementary Note 12 or 13, wherein
  the third information element causes the radio terminal to, if the third information element indicates deactivation, determine that a search space associated with the third information element does not need to be monitored to receive downlink control information, and
  the third information element causes the radio terminal to, if the third information element does not indicate deactivation, determine that the search space associated with the third information element needs to be monitored to receive downlink control information.

(Supplementary Note 15)

The base station according to any one of Supplementary Notes 12 to 14, wherein the third information element causes a Radio Resource Control (RRC) of the radio terminal to, if the third information element indicates deactivation, inform a physical layer of the radio terminal that a search space associated with the third information element does not need to be monitored.

(Supplementary Note 16)

The base station according to any one of Supplementary Notes 12 to 14, wherein the third information element causes a Radio Resource Control (RRC) of the radio terminal to, if the third information element indicates deactivation, configure a physical layer of the radio terminal not to monitor a search space associated with the third information element.

(Supplementary Note 17)

The base station according to any one of Supplementary Notes 12 to 16, wherein the second information element includes an information element indicating an identifier of each search space.

(Supplementary Note 18)

The base station according to any one of Supplementary Notes 12 to 17, wherein the second information element includes at least one of: an information element indicating a resource location of each search space; an information element indicating a type of each search space; an information element indicating a type of downlink control information to be monitored in each search space; or an information element indicating periodicity of each search space.

(Supplementary Note 19)

The base station according to any one of Supplementary Notes 12 to 18, wherein
  the first information element relates to a configuration of a single downlink Bandwidth Part (BWP), and
  the second and third information elements relate to each search space configured within the downlink BWP.

(Supplementary Note 20)

The base station according to any one of Supplementary Notes 12 to 19, wherein the dedicated signaling message is a Radio Resource Control (RRC) message.

(Supplementary Note 21)

The base station according to Supplementary Note 20, wherein
  the first information element is a searchSpacesToAddModList information element,
  the second information element is a SearchSpace information element included in the searchSpacesToAddModList information element, and
  the third information element is contained in the SearchSpace information element.

(Supplementary Note 22)

The base station according to any one of Supplementary Notes 12 to 21, wherein the at least one processor is configured to, when the radio terminal is handed over to the base station from another base station, transmit the dedicated signaling message to the radio terminal via the other base station.

(Supplementary Note 23)

A method for a radio terminal, the method comprising:
  receiving a first information element indicating a list of search spaces configured by a base station for the radio terminal via a dedicated signaling message destined for the radio terminal, wherein
  the first information element contains a second information element indicating a configuration of each search space required by the radio terminal to monitor downlink control information in each search space included in the list, and
  the first information element further contains a third information element indicating, on a per-search space basis, whether each search space is initially deactivated.

(Supplementary Note 24)

A method for a base station, the method comprising:
  transmitting to a radio terminal a first information element indicating a list of search spaces configured by the base station for the radio terminal via a dedicated signaling message destined for the radio terminal, wherein
  the first information element contains a second information element indicating a configuration of each search space required by the radio terminal to monitor downlink control information in each search space included in the list, and the first information element further contains a third information element indicating, on a per-search space basis, whether each search space is initially deactivated.

(Supplementary Note 25)

A program for causing a computer to perform a method for a radio terminal, wherein the method comprises receiving a first information element indicating a list of search spaces configured by a base station for the radio terminal via a dedicated signaling message destined for the radio terminal, wherein the first information element contains a second information element indicating a configuration of each search space required by the radio terminal to monitor downlink control information in each search space included in the list, and the first information element further contains a third information element indicating, on a per-search space basis, whether each search space is initially deactivated.

(Supplementary Note 26)

A program for causing a computer to perform a method for a base station, wherein the method comprises transmitting to a radio terminal a first information element indicating a list of search spaces configured by the base station for the radio terminal via a dedicated signaling message destined for the radio terminal, wherein the first information element contains a second information element indicating a configuration of each search space required by the radio terminal to monitor downlink control information in each search space included in the list, and the first information element further contains a third information element indicating, on a per-search space basis, whether each search space is initially deactivated.

This application is based upon and claims the benefit of priority from Japanese Patent Application No. 2019-022949, filed on Feb. 12, 2019, the disclosure of which is incorporated herein in its entirety by reference.

REFERENCE SIGNS LIST 1 gNB
2 UE
101 Air Interface
604 Processor
605 Memory
703 Baseband Processor
704 Application Processor
706 Memory

What is claimed is:

1. A radio terminal comprising:
at least one memory; and
at least one processor coupled to the at least one memory and configured to receive a first information element indicating a list of search spaces configured by a base station for the radio terminal via a dedicated signaling message destined for the radio terminal, wherein
the first information element contains a second information element indicating a configuration of each search space required by the radio terminal to monitor downlink control information in each search space included in the list, and
the first information element further contains a third information element indicating, on a per-search space basis, whether each search space is initially deactivated.

2. The radio terminal according to claim 1, wherein the at least one processor is configured to determine, on a per-search space basis, whether each search space needs to be monitored to receive downlink control information, based on the third information element.

3. The radio terminal according to claim 1, wherein
the at least one processor is configured to, if the third information element indicates deactivation, determine that a search space associated with the third information element does not need to be monitored to receive downlink control information, and
the at least one processor is configured to, if the third information element does not indicate deactivation, determine that the search space associated with the third information element needs to be monitored to receive downlink control information.

4. The radio terminal according to claim 1, wherein the at least one processor is configured to perform a Radio Resource Control (RRC) layer operation,
wherein the RRC layer operation includes, if the third information element indicates deactivation, informing a physical layer of the radio terminal that a search space associated with the third information element does not need to be monitored.

5. The radio terminal according to claim 1, wherein the at least one processor is configured to perform a Radio Resource Control (RRC) layer operation,
wherein the RRC layer operation includes, if the third information element indicates deactivation, configuring a physical layer of the radio terminal not to monitor a search space associated with the third information element.

6. The radio terminal according to claim 1, wherein the second information element includes an information element indicating an identifier of each search space.

7. The radio terminal according to claim 1, wherein the second information element includes at least one of: an information element indicating a resource location of each search space; an information element indicating a type of each search space; an information element indicating a type of downlink control information to be monitored in each search space; or an information element indicating periodicity of each search space.

8. The radio terminal according to claim 1, wherein
the first information element relates to a configuration of a single downlink Bandwidth Part (BWP), and
the second and third information elements relate to each search space configured within the downlink BWP.

9. The radio terminal according to claim 1, wherein the dedicated signaling message is a Radio Resource Control (RRC) message.

10. The radio terminal according to claim 9, wherein
the first information element is a searchSpacesToAddModList information element,
the second information element is a SearchSpace information element included in the searchSpacesToAddModList information element, and
the third information element is contained in the SearchSpace information element.

11. The radio terminal according to claim 1, wherein the at least one processor is configured to, when the radio terminal is handed over to the base station from another base station, receive the dedicated signaling message via the other base station.

12. A base station comprising:
at least one memory; and
at least one processor coupled to the at least one memory and configured to transmit to a radio terminal a first information element indicating a list of search spaces configured by the base station for the radio terminal via a dedicated signaling message destined for the radio terminal, wherein
the first information element contains a second information element indicating a configuration of each search space required by the radio terminal to monitor downlink control information in each search space included in the list, and
the first information element further contains a third information element indicating, on a per-search space basis, whether each search space is initially deactivated.

13. The base station according to claim 12, wherein the third information element causes the radio terminal to determine, on a per-search space basis, whether each search space needs to be monitored to receive downlink control information.

14. The base station according to claim 12, wherein
the third information element causes the radio terminal to, if the third information element indicates deactivation, determine that a search space associated with the third information element does not need to be monitored to receive downlink control information, and
the third information element causes the radio terminal to, if the third information element does not indicate deactivation, determine that the search space associated with the third information element needs to be monitored to receive downlink control information.

15. The base station according to claim 12, wherein the third information element causes a Radio Resource Control (RRC) of the radio terminal to, if the third information element indicates deactivation, inform a physical layer of the radio terminal that a search space associated with the third information element does not need to be monitored.

16. The base station according to claim 12, wherein the third information element causes a Radio Resource Control (RRC) of the radio terminal to, if the third information element indicates deactivation, configure a physical layer of the radio terminal not to monitor a search space associated with the third information element.

17. The base station according to claim 12, wherein the second information element includes an information element indicating an identifier of each search space.

18. The base station according to claim 12, wherein the second information element includes at least one of: an information element indicating a resource location of each search space; an information element indicating a type of each search space; an information element indicating a type of downlink control information to be monitored in each search space; or an information element indicating periodicity of each search space.

19. The base station according to claim 12, wherein
the first information element relates to a configuration of a single downlink Bandwidth Part (BWP), and
the second and third information elements relate to each search space configured within the downlink BWP.

20. A method for a radio terminal, the method comprising:
receiving a first information element indicating a list of search spaces configured by a base station for the radio terminal via a dedicated signaling message destined for the radio terminal, wherein
the first information element contains a second information element indicating a configuration of each search space required by the radio terminal to monitor downlink control information in each search space included in the list, and
the first information element further contains a third information element indicating, on a per-search space basis, whether each search space is initially deactivated.

* * * * *